United States Patent

Vaithyanathan et al.

[11] Patent Number: 5,857,179
[45] Date of Patent: Jan. 5, 1999

[54] COMPUTER METHOD AND APPARATUS FOR CLUSTERING DOCUMENTS AND AUTOMATIC GENERATION OF CLUSTER KEYWORDS

[75] Inventors: Shivakumar Vaithyanathan, Nashua, N.H.; Mark R. Adler, Lexington, Mass.; Christopher G. Hill, Cumming, Ga.

[73] Assignee: Digital Equipment Corporation, Maynard, Mass.

[21] Appl. No.: 709,755

[22] Filed: Sep. 9, 1996

[51] Int. Cl.⁶ .................................................. G06F 17/30
[52] U.S. Cl. .............................................. 707/2; 395/794
[58] Field of Search ...................... 395/601, 602, 395/603, 604, 605, 611, 616, 11, 13, 50, 751, 752, 758, 759, 760, 761, 779, 788, 792, 794

[56] References Cited

U.S. PATENT DOCUMENTS

| | | | |
|---|---|---|---|
| 4,839,853 | 6/1989 | Deerwester et al. | 364/900 |
| 5,263,120 | 11/1993 | Bickel | 395/11 |
| 5,343,554 | 8/1994 | Koza et al. | 395/13 |
| 5,481,712 | 1/1996 | Silver et al. | 395/701 |
| 5,559,940 | 9/1996 | Hutson | 395/788 |
| 5,619,709 | 4/1997 | Caid et al. | 707/532 |

OTHER PUBLICATIONS

Jain, A.K., et al., "Algorithms for Clustering Data," Michigan State University, Prentice Hall, Englewood Cliffs, New Jersey 07632, pp. 96–101 (1988).

Faloutsos, C., et al., "A Survey of Information Retrieval and Filtering," University of Maryland, College Park, MD 20742, pp. 1–22 (no date given).

Cutting, D.R., et al., "Scatter/Gather: A Cluster–based Approach to Browsing Large Document Collections," *Proceedings of the Fifteenth Annual International ACM SIGIR Conference*, pp. 318–329 (Jun. 1992).

Cutting, D.R., et al., "Constant Interaction–Time Scatter/Gather Browsing of Very Large Document Collections," *Proceedings of the Sixteenth Annual International ACM SIGIR Conference*, pp. 1–9 (Jun. 1993).

Faber, V., "Clustering and the Continuous k–Means Algorithm," (No Date Given).

Singhal, A., "Length Normalizatin in Degraded Text Collections," Department of Computer Science,, Cornell University, Ithaca, NY 14853, pp. 1–19 (no date given).

*Primary Examiner*—Thomas G. Black
*Assistant Examiner*—Buay Lian Ho
*Attorney, Agent, or Firm*—David A. Dagg

[57] ABSTRACT

A computer method and apparatus determines keywords of documents. An initial document by term matrix is formed, each document being represented by a respective M dimensional vector, where M represents the number of terms or words in a predetermined domain of documents. The dimensionality of the initial matrix is reduced to form resultant vectors of the documents. The resultant vectors are then clustered such that correlated documents are grouped into respective clusters. For each cluster, the terms having greatest impact on the documents in that cluster are identified. The identified terms represent key words of each document in that cluster. Further, the identified terms form a cluster summary indicative of the documents in that cluster.

20 Claims, 10 Drawing Sheets

| CLUSTER 0 | CLUSTER 140 | CLUSTER 222 |
|---|---|---|
| DUMP<br>BACKUP<br>TAPE<br>RESTORE<br>COMMAND<br>USING<br>FILESYSTEM<br>DRIVE<br>DISK<br>DOING<br>DEVICE<br>BACKUPS<br>SCRIPT<br>TOLD<br>COMMANDS | PRINTER<br>PRINTCAP<br>SETTING<br>SETUP<br>ENTRY<br>NETWORK<br>HELP<br>LPR<br>LPRSETUP<br>REMOTE<br>DEFAULT<br>SANDY<br>PORT<br>SERIAL<br>USING | REBUILDING<br>KERNEL<br>REBUILD<br>DOCONFIG<br>KERNAL<br>CONFIG<br>KHP<br>BUILD<br>ADDING<br>CONFIGURATION<br>OPTIONS<br>SUBSETS<br>TRENTA<br>TRIED<br>REINSTALL |

FIG. 4A

| CLUSTER 140 | CLUSTER 277 | CLUSTER 291 |
|---|---|---|
| PRINTER<br>PRINTCAP<br>SETTING<br>SETUP<br>ENTRY<br>NETWORK<br>HELP<br>LPR<br>LPRSETUP<br>REMOTE<br>DEFAULT<br>SANDY<br>PORT<br>SERIAL<br>USING | PARALLEL<br>PRINTER<br>PORT<br>PRINTING<br>RW<br>PRINTCAP<br>SETTING<br>LPRSETUP<br>ENTRY<br>SANDY<br>HELP<br>SETUP<br>HP<br>DEVICE<br>PRINTERS | FILTER<br>PRINTER<br>PRINTCAP<br>PRINTING<br>LPR<br>PRINTERS<br>ESCAPE<br>SEND<br>USING<br>TOLD<br>ENTRY<br>HP<br>SANDY<br>PAGE<br>TRY |

FIG. 4B

Current Database: *UNIX_95*—101
Current Query: *backup:*—102
Open Databases: *1*
Number of Documents: *2272*—103
Number of keys: *1*

112A  107A
Group 0 (64)

105A—*dump backup tape command restore commands joek backups script using*—104A
- Unix v3.2 dump - wants to append tape (0.11) —108A
- rdump return code 139.. what does it mean (0.17) —109A
106A
- OSF/1 3.2b how to backup disks with tar on a Cybernetics 20G tape (0.19)—110A
- OSF 3.2 Wants some advice on backup strategies (0.20) —111A 112B
Group 9 (50)—107B 105B—*backup copy directory create pages script additional remove entry entries*—104B
- I/O error (0.12) —108B
106B
- Dump doesn't work with EXABYTE 8205 tape drive (0.14)
- need remote support for OSF LSM/ADVFS/restore ADVFS filesystems (0.14)
- kernel build hanging (0.15)

112C
Group 119 (47)—107C

105C—*restoring restore backup root restored mount dump disk boot filesystem*  —104C
- /filesystem and maybe others corrupted and needs help restoring (0.24)
106C
- Questions on restore - osf (0.25)                                                    108C
- can not boot system,/bin deleted (0.26)
- problem root filesystem on 5900 (0.26)

112D
Group 70 (42)—107D

105D—*networker client nsr backup clients save satish started savegroup legato*  —104D
- Polycenter Networker Save and Restore (0.16) —108D
106D
- netware client, incremental backs up all files, NSR 3.0 (0.16)
- unable to start a client backup with 3.1 nsr (0.16)
- problems preventing backup of /cdrom, networker v3.1 (0.17)

112E
Group 106 (41)—107E

105E—*client nsr backup ellis clients save setting told decnsr kit*         108E   —104E
- help with mminfo and flags, determining backup of NSR (0.12)
106E
- ? on nsr backing up novell servers (0.15)
- backup now, and mminfo shows yesterday date, nsr (0.15)
- nsr client won't backup (0.16)

112F
Group 121 (37)—107F

105F—*decnsr backup nsr client clients save ellis networker savegroup using*   —104F
- decnsr, warning, file grew during backup (0.19) —108F
106F
- decnsr2.1a question (0.19)
- NSR 3.0 on ASE (0.21)
- DECnsr and tape storage (0.21)

FIG. 5

1. user wants general questions answered on using nsr.
2. questions on NSR 3.0.
3. how to use nsr ?
4. on differences with nsr 2.0 to nsr 3.0.
5. questions configuring printer.
6. OSF/1 custonmer cannot access lpr command
7. has no lpr command and other printer stuff
8. receiving extra banner page with printer using lpr
9. ??'s on suppressing header on Ultrix lat printer.
10. 4.4/customer has questions dump|restore
11. ?? on how to restore a file from dump backup.
12. Questions on restore command and multiple dump on tape.
13. Problems with backup to tiz06 OSF/I 2.0 dump.
14. Problems with restore -I Ultrix 4.3a
15. getting file system full messages on nsr
16. how to eject nsr tape when nsr is finished.
17. getting io errors on one oracle db during nsr backup
18. osf, nsr 3.1, will it backup ultrix.
19. Questions: Printer can't print large file

FIG. 6A

TERM

| DOCUMENT | COMMAND | QUESTIONS | USING | FILE | NSR | PRINTER | LPR | DUMP | RESTORE | BACKUP | OSF | TAPE |
|---|---|---|---|---|---|---|---|---|---|---|---|---|
| 1. | - | - | 1.0 | - | 1.0 | - | - | - | - | - | - | - |
| 2. | - | 1.0 | - | - | 1.0 | - | - | - | - | - | - | - |
| 3. | - | - | - | - | 1.0 | - | - | - | - | - | - | - |
| 4. | - | - | - | - | 2.0 | - | - | - | - | - | - | - |
| 5. | - | 1.0 | - | - | - | 1.0 | - | - | - | - | - | - |
| 6. | 1.0 | - | - | - | - | - | 1.0 | - | - | 1.0 | - | - |
| 7. | 1.0 | - | 1.0 | - | - | 1.0 | 1.0 | - | - | - | - | - |
| 8. | - | - | - | - | - | 1.0 | - | - | - | - | - | - |
| 9. | - | - | - | - | - | - | - | - | - | - | - | - |
| 10. | - | 1.0 | - | - | - | - | - | 1.0 | 1.0 | - | - | - |
| 11. | - | - | - | 1.0 | - | - | - | 1.0 | 1.0 | 1.0 | - | 1.0 |
| 12. | 1.0 | 1.0 | - | - | - | - | - | 1.0 | 1.0 | - | - | - |
| 13. | - | - | - | - | - | - | - | 1.0 | - | 1.0 | 1.0 | - |
| 14. | - | - | - | - | - | - | - | - | 1.0 | - | - | - |
| 15. | - | - | - | 1.0 | 1.0 | - | - | - | - | - | - | - |
| 16. | - | - | - | - | 2.0 | - | - | - | - | 1.0 | - | 1.0 |
| 17. | - | - | - | - | 1.0 | - | - | - | - | 1.0 | - | - |
| 18. | - | - | - | - | 1.0 | - | - | - | - | 1.0 | 1.0 | - |
| 19. | - | 1.0 | - | 1.0 | - | 1.0 | - | - | - | - | - | - |

| 0.0213 | 0.0659 | -0.3968 | -0.2726 | 0.1430 | 0.0786 | 0.1017 | -0.2380 | 0.5001 | -0.0096 | -0.0045 | -0.6477 |
| --- | --- | --- | --- | --- | --- | --- | --- | --- | --- | --- | --- |
| 0.1323 | 0.1810 | 0.2796 | 0.5359 | -0.0115 | -0.5340 | 0.2527 | -0.1312 | -0.0143 | -0.2402 | 0.1700 | -0.3622 |
| 0.2962 | 0.2257 | -0.7106 | 0.2931 | -0.0294 | 0.0486 | -0.2383 | -0.1388 | -0.3252 | -0.0768 | 0.2614 | 0.1059 |
| -0.1517 | 0.5389 | 0.1995 | -0.5138 | -0.1007 | -0.1407 | -0.1477 | 0.0045 | -0.3196 | 0.1453 | 0.4221 | -0.1720 |
| 0.5118 | -0.0400 | -0.0625 | -0.0656 | -0.4825 | 0.0656 | -0.3747 | 0.2140 | 0.0343 | 0.1467 | -0.3917 | 0.3630 |
| 0.2544 | -0.4844 | 0.0053 | -0.0330 | -0.0248 | 0.1071 | 0.4229 | 0.0295 | -0.1648 | 0.4392 | 0.5260 | -0.1046 |
| 0.1602 | 0.1880 | 0.2257 | -0.0424 | 0.0534 | 0.6073 | 0.3731 | -0.3762 | -0.3027 | -0.3571 | -0.1141 | -0.0414 |
| 0.2718 | 0.4252 | 0.0504 | 0.1625 | -0.4521 | 0.2958 | 0.1663 | 0.4411 | 0.4209 | 0.1101 | 0.0848 | 0.0758 |
| 0.0822 | 0.2979 | 0.0919 | 0.1354 | 0.8558 | 0.0901 | 0.0429 | 0.1627 | 0.1404 | 0.2129 | 0.1207 | 0.1711 |

| CLUSTER I - 10,11,12,13,14 ||| CLUSTER II - 5,6,7,8,9,19 ||| CLUSTER III - 1,2,3,4,15,16,17,18 |||
|---|---|---|---|---|---|---|---|---|
| ELEMENT | LOAD | OCCUR | ELEMENT | LOAD | OCCUR | ELEMENT | LOAD | OCCUR |
| RESTORE | 4.702 | 4 | PRINTER | 7.375 | 5 | NSR | 14.517 | 8 |
| DUMP | 4.1752 | 4 | LPR | 3.657 | 3 | BACKUP | 3.022 | 2 |
| BACKUP | 3.022 | 2 | QUESTIONS | 2.871 | 2 | QUESTIONS | 2.871 | 2 |
| QUESTIONS | 2.871 | 2 | COMMAND | 2.56 | 2 | OSF | 0.882 | 1 |
| COMMAND | 1.28 | 1 | OSF | 0.882 | 1 | FILE | 0.8558 | 1 |
| OSF | 0.882 | 1 | FILE | 0.855 | 1 | TAPE | 0.7559 | 1 |
| FILE | 0.8558 | 1 | USING | 0.435 | 1 | USING | 0.435 | 1 |
| TAPE | 0.7559 | 1 | | | | | | |

FIG. 6F

| CLUSTER I - 11,12 | |
|---|---|
| RESTORE | 2.351 |
| DUMP | 2.0876 |
| BACKUP | 1.511 |
| QUESTIONS | 1.4355 |
| COMMAND | 1.28 |
| FILE | 0.855 |
| TAPE | 0.755 |

| CLUSTER III - 17,18 | |
|---|---|
| BACKUP | 3.022 |
| NSR | 2.903 |
| OSF | 0.882 |

FIG. 6G

COMPUTER METHOD AND APPARATUS FOR CLUSTERING DOCUMENTS AND AUTOMATIC GENERATION OF CLUSTER KEYWORDS

BACKGROUND OF THE INVENTION

The past few years have witnessed exponential growth in the variety of electronic sources of information. In such an environment it is a non-trivial task to provide a wide body of users with relevant and quality information. This task is more challenging in an environment where a plurality of users with diverse needs access the same body of data to obtain their specific information. For example, in information retrieval applications, simple keyword queries can be composed very quickly, however they tend to be very general and underspecified. In such cases, keyword-based information retrieval systems suffer greatly and the user is often required to wade through a large number of retrieved articles to obtain pertinent information. On the other hand, too specific a query often overconstrains the retrieval system, and the search returns either too few or no documents. These problems are magnified further in an environment where the users are not entirely familiar with the underlying text collection, and where the information content is continuously changing.

Various methods for organizing and retrieving information from databases have been developed in an attempt to overcome these problems. In one such method, a collection of documents is represented as a term by document matrix. Singular value decomposition (SVD) is applied to the term by document matrix to uncover the underlying latent semantic structure of word usage in the documents. A user query, represented as a vector in the statistical domain, is compared with the three matrices resulting from SVD, providing the user with a list of documents represented by vectors most closely matching the query vector. The user must then wade through the documents which may or may not be relevant to the search. This method is disclosed in S. Deerwester, et al., "Indexing by Latent Semantic Analysis," Journal of the Society for Information Science, Vol 41, No. 6, p. 391–407 (1990), and U.S. Pat. No. 4,839,853, by Deerwester, et al. This method suffers from computational inefficiency, especially for large databases, as the algorithm involves representing the query in the SVD domain and performing a computationally-demanding nearest-neighbor search between the query and each document vector in the domain.

In another method, clustering algorithms are employed to categorize correlated documents. In information retrieval applications, the results of user queries are generally returned in an automatically structured format. An example is the scatter/gather approach developed and described in "Scatter/Gather: A Cluster Based Approach to Browsing Large Document Collections" by D. R. Cutting, D. R. Karger and J. O. Pederson in Proceedings of SIGIR '92 (1992). This approach is primarily a browsing aid which does not employ a query mechanism. The scatter/gather approach employs an on-line clustering algorithm to combine articles from chosen clusters. These clusters are then provided along with a "cluster digest" that comprises a list of the highest weighted terms in the cluster.

Clustering is generally known in the art as a difficult and time consuming task. The more robust the clustering process, the more time it takes to run. For example, a clustering process can take from a few seconds to several hours depending on the size of the database. This arises in part due to the large dimensionality of the original domain. To date, clustering algorithms are generally designed for speed while performed on-line, that is, the clustering process is not pre-computed but rather is performed in real-time. The use of such quick and dirty algorithms greatly reduces the accuracy and reliability of the overall system. On-line clustering generally consumes great amounts of processor time. For this reason, clustering algorithms designed for on-line applications generally are less robust than off-line clustering algorithms. Another clustering solution involves frequency-based document clustering, with clustering performed on the top percentage of query "hits". Although this technique is slightly faster because the size of the data is reduced, data from other non-retrieved clusters is ignored, and therefore, the retrieval is less robust.

Overall, the mechanics of organizing large sets of documents in response to a user query in a time efficient and robust manner remains an open question.

SUMMARY OF THE INVENTION

The present invention solves the foregoing problems of the prior art. In particular, the present invention provides a method and apparatus for categorizing documents in a predefined domain. This is done in a time-efficient and robust manner which overcomes the limitations of the prior art. The present invention has application in the fields of information retrieval, data mining and information filtering, for example.

In one aspect of the present invention, each document is represented by a respective M dimensional vector, where M represents the number of terms or words from a predetermined domain of documents. The vectors are stored in an initial matrix of documents and terms. The dimensionality of the initial matrix is reduced to form resultant vectors of the documents. The resultant vectors are then clustered such that different respective documents are grouped into different clusters.

In another aspect of the present invention, for each cluster the terms having greatest impact on the documents in that cluster are identified. The identified terms represent keywords of each document in that cluster. Further, the identified words form a cluster summary indicative of the documents in that cluster.

As to the step of reducing dimensionality of the matrix, a preferred embodiment of the present invention performs a principal component analysis (PCA) on the initial matrix. In the first step of PCA, a singular value decomposition (SVD) is performed on the initial matrix to obtain a working matrix of loading vectors. The loading vectors may comprise:

1) Eigenvectors of the sum squared of products of the initial matrix;
2) Eigenvectors of the covariance of the initial matrix; or
3) Eigenvectors of the correlation of the initial matrix.

In the second step of PCA, the initial matrix is projected onto the working matrix of loading vectors, resulting in a matrix of reduced dimensionality.

PCA captures the underlying correlation of terms in the initial matrix of large dimensionality, and retains that correlation in the matrix of reduced dimensionality. Clustering is performed on the matrix of reduced dimensionality allowing the process to be performed with greater speed and accuracy, as the size of the matrix is smaller and noise is diminished. Further, the captured correlation of words is effective in automatically generating keywords to define each cluster.

In accordance with another aspect of the present invention, the step of clustering includes using a clustering algorithm on the matrix of reduced dimensionality. As such, a preferred embodiment of the present invention combines principal component analysis (PCA) and K-means clustering to provide vectors representative of documents, the vectors being reduced in noise and dimensionality for manageability, but maintaining important information regarding the correlation between words indicative of subject matter of the documents in each cluster. Clustering techniques other than K-means may optionally be employed.

In accordance with another aspect of the present invention, the step of identifying words having greatest impact on documents in a cluster includes, for each resultant vector, representing each component part of the resultant vector as a sum of products. Each product is formed by multiplying a component part of the initial vector and the absolute value of a corresponding component part of a single Eigenvector. The products are summed across all Eigenvectors to produce a first sum of products. Each first sum of products is indicative of the weight of a respective word in the document. This process is repeated for all documents in a cluster and the respective first sums of products are summed to generate a second sum of products. The inventive method identifies certain products in the second sum of products as being substantially larger than the other products. The respective words of the identified certain products are considered to be the words having greatest impact on the cluster, and hence are the keywords of the cluster. In a preferred embodiment, in each component part, the products are normalized with respect to the largest product in that component part.

The present invention is useful for information retrieval, information filtering, and data mining, among other applications. As to information retrieval, the identified words for each cluster form a cluster summary for the cluster. In response to a user query, a series of clusters are presented to the user, each cluster being categorized by a set of keywords forming cluster summaries. The cluster summaries are returned along with a few articles from each cluster which provide a browsing aid to the user. From the cluster summaries, a user selects a desired cluster of documents. After reviewing the cluster summary and skimming titles of documents in the selected cluster, a user chooses specific individual documents as desired.

As to information filtering, the present invention further classifies documents of a common cluster to a group of information. As such a method for information filtering is provided. Through filtering, the clusters are identified by their main words. With this information, a meta-summary of each cluster is provided. This is useful for performing various filtering processes.

With respect to data mining, the present invention may further include the step of cross-referencing document clusters having an identified word in common. This allows one to identify novel underlying correlations.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principals of the invention.

FIGS. 4A–4B and 5 are tables representing various cluster summaries.

FIGS. 6A–6G are charts representing an experimental clustering of sentences.

DETAILED DESCRIPTION OF THE PREFERRED EMBODIMENT

As used herein, the term "document" includes written articles, papers, as well as written statements, phrases and comments or groups of words however loosely connected in a written work. The term "domain" is defined herein as a collection of documents, for example a database. Note that while the detailed description of the present invention describes embodiments in the field of information retrieval, this is by way of example only. The present invention has application in other fields as well, including data mining and information filtering for example, as described above.

Figure 1:
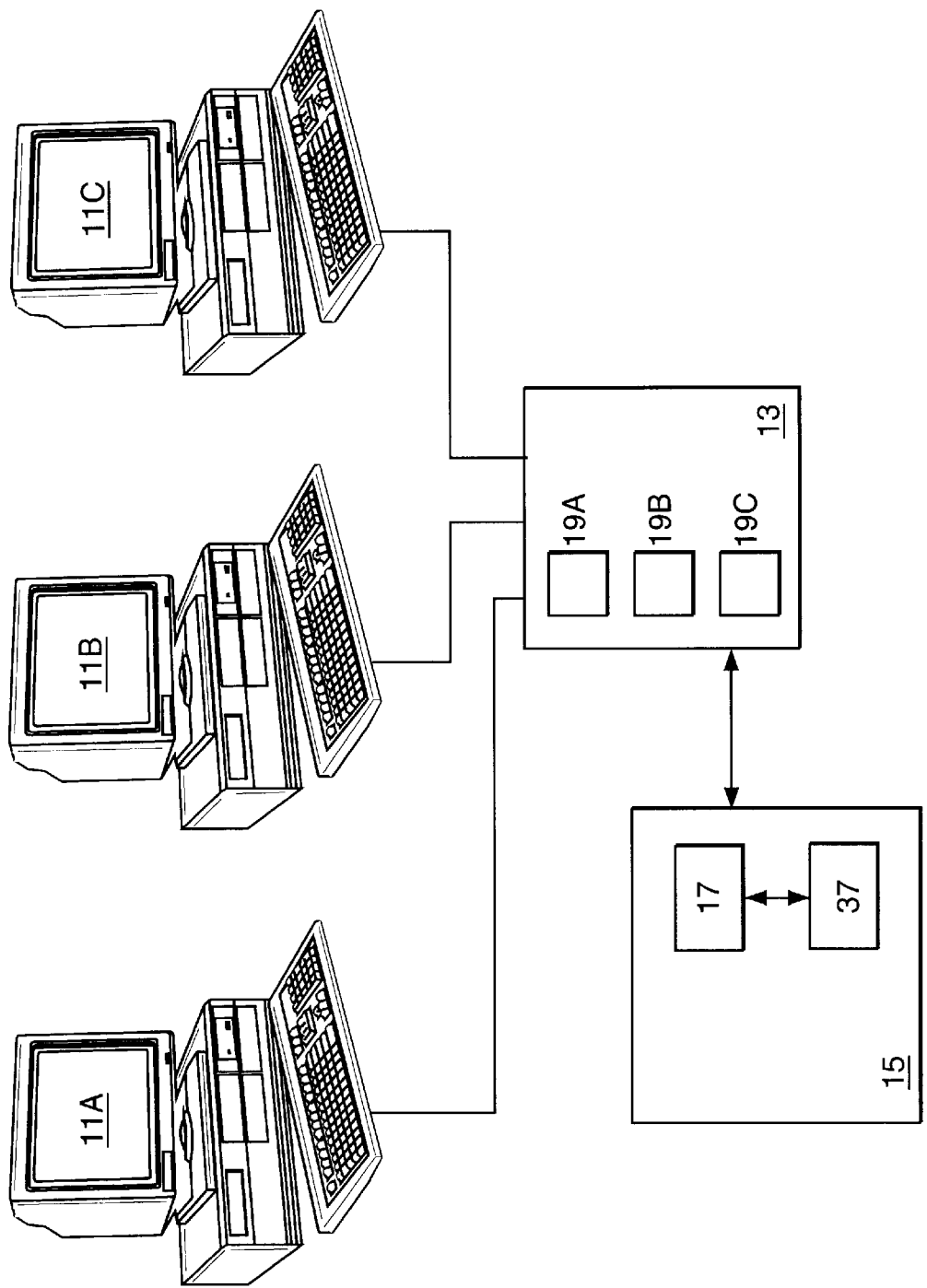
FIG. 1 is a schematic overview of a computer system employing the present invention.

FIG. 1 illustrates a computer system employing the present invention. One or more working terminals or computers, 11A, 11B and 11C, are coupled to a memory storage device 13. Preferably working terminals 11A–C are, for example, IBM™ PC's having Intel™ XX386™ or better processing capabilities, input means (e.g., keyboard, mouse ...), and the like. Various users of working terminals 11A–C generate documents through word processing applications programs, electronic message programs, and other text producing programs run at the respective terminals 11A–C. The documents 19 are forwarded from respective generating terminals 11A–C and retained in memory storage 13.

Memory storage 13 is a database or memory means for holding documents in electronic data form. For example, each document 19 may be represented by a text file, ASCII file or similar file in memory storage 13. Further, memory storage 13 follows a standard search and retrieval protocol such as Structured Query Language (SQL). This enables users at working terminals 11A–C to retrieve from memory storage 13 desired documents 19 or information previously stored. In one embodiment users generate search queries formed of terms or words indicative of subject matter/ content of desired documents 19. The search queries are transmitted to a search and/or retrieval engine 17 associated with memory storage 13. In response, the retrieval engine 17 determines which stored documents 19 are relevant based on the given keywords.

Figure 2:
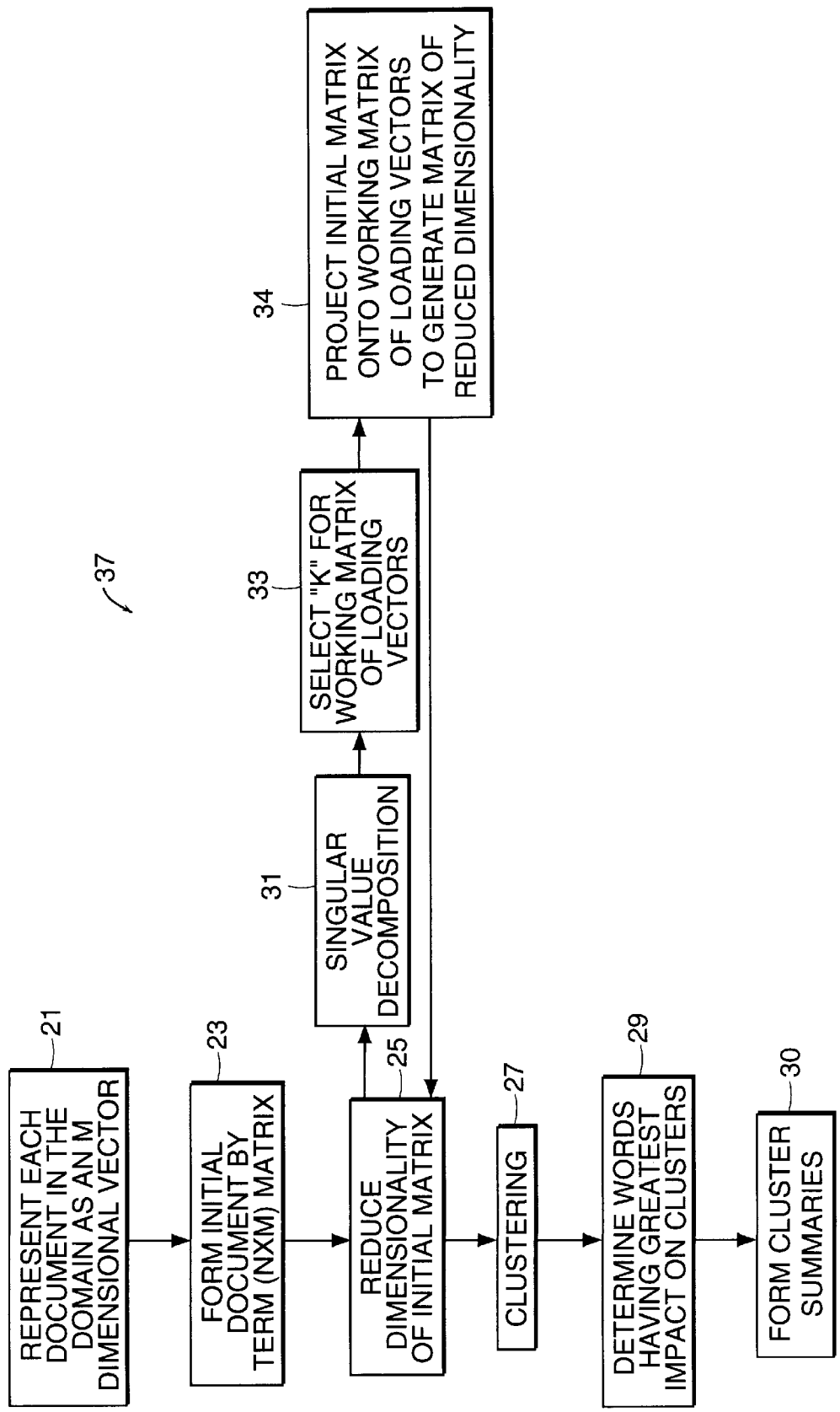
FIG. 2 is a flow diagram of a preferred embodiment of the present invention.

The present invention assists in that determination by providing an indication of the keywords of each document 19 stored in memory storage 13. In particular, one aspect of the present invention determines words of highest or greatest impact on a document 19 as opposed to words of greatest frequency in a document. This is accomplished as follows and as illustrated in FIG. 1 and FIG. 2. Further, the present invention provides a structure in which search results are returned. In particular, the present invention returns groupings or clusters of documents based on keywords in common amongst the documents or underlying correlations between documents. In addition, the present invention provides a summary of the keywords for each cluster of documents. This enables users to browse through portions of search results one cluster at a time before singling out and reviewing a specific document. In this manner, the present invention provides a post-query-navigation method and apparatus useful in information retrieval applications, for example.

The retrieval engine 17 and apparatus of the present invention 37 as shown in FIG. 1 are operated or executed on a digital processor 15. Digital processor 15 may be a server or host for a network of working terminals 11A–C. Alternatively, the digital processor 15 is representative of processor units in any one or more of working terminals 11A–C. In the embodiment shown in FIG. 1, the retrieval engine 17 and present invention apparatus 37 are executed on working terminal(s) 11A–C. Other configurations well known to those skilled in the art of computer hardware and software configurations are suitable.

In the preferred embodiment, the apparatus of the present invention 37 is a task, subroutine, or procedure called from a retrieval engine 17. After initialization, the subroutine 37 performs the processes outlined in FIG. 2 and illustrated in corresponding FIG. 3. Initially each document in a given domain stored in memory 13 is represented as an M dimensional vector 21, where M represents the number of terms or words in a predefined domain of documents as shown in FIG. 2. Typically, the domain comprises thousands of words following a standardized set of format rules and compiled in a series of pre-processing steps. By way of example, the format rules may include:

| | |
|---|---|
| Step 0 | Remove all tokens with numerical characters. |
| Step 1 | Remove all tokens with three consecutive characters as the same letter. |
| Step 2 | Normalize all upper and lower case letters. |
| Step 3 | Remove all keywords having special characters other than "-" and "_". |
| Step 4 | For all keywords having either "-" or "_", remove "-" or "_" from the string and concatenate. (e.g., back-up=>backup). |
| Step 5 | Run through a stop word list of 539 entries. (e.g. "a", "the", |
| Step 6 | Ignore the words in a line if the line is at the end of a work unit or article and the line has less than 3 words. (e.g. signatures and/or closing lines) |
| Step 7 | Remove all words occurring in less than P documents. |

For example, in an experiment conducted by the inventors, a bag-of-words model was used to determine a list of words for an experimental domain. The model was operated on a UNIX_95 hotline database maintained by Digital Equipment Corporation™ which is presently indexed by approximately 300,000 words. This database contains documents generated by customers and hotline employees to describe problems and explain how they were resolved. Because the experimental domain consists of entirely technical articles, on-line dictionaries were of little use, since many technical terms and acronyms are not represented in general dictionaries. Moreover, since the UNIX_95 database covers a limited class of UNIX-related problems, the distinction between problem topics or clusters is less well-defined. This made the experimental task more challenging than working with a corpus dealing with a wide range of topics. The pre-processing steps listed above reduced the 300,000 words in the domain to 11,707.

Given a document, for each word in the domain, step 21 (see FIG. 2) of process 37 calculates a weight of that word as used in the document. The weight defines one of the M vector values for the document's vector. Vector values for domain words that do not appear in the document are set to zero. Weightings (or vector values) of the domain words appearing in the document are defined by popular weighting methods including the following two methods described in Singhal, et al., "Length Normalization in Degraded Text Collections", TR95-1507, Dept. of Computer Science, Cornell University, incorporated herein by reference and provided by way of example:

a) "Tf-idf"
This is one of the most popular weighting methods used in document clustering and classification. The "tf" or "term-frequency" is a simple count of the occurrences of each term in a specified document.

$$W_{ij} = tf_{ij} \cdot \log \frac{(n_{articles})}{df_i}$$

Where $W_{ij}$ is the weight of term "i" in article "j".

$tf_{ij}$ is the frequency of occurrence of term "i" in article "j".

$df_i$ is the total number of articles in which term "i" occurs.

$n_{articles}$ is the total number of articles in the domain.

b) "Tf-idf with length normalization"
This weighting method is a variant of the tf-idf method which accounts for the length of the article by using a normalization factor. The formula for the computation of the weight $W_{ij}$ is as follows:

$$W_{ij} = \frac{0.5 + 0.5 * \frac{tf_{ij}}{\max(tf_{ij})} * \log\left(\frac{n_{articles}}{df_i}\right)}{\sqrt{\Sigma\left(\left(0.5 + 0.5 * \frac{tf_{ij}}{\max(tf_{ij})}\right) \log\left(\frac{n_{articles}}{df_i}\right)\right)^2}}$$

Where $W_{ij}$ is the weight of term "i" in article "j".

$tf_{ij}$ is the frequency of occurrence of term "i" in article "j".

$df_i$ is the total number of articles in which term "i" occurs.

$n_{articles}$ is the total number of articles in the domain.

Collectively, the vectors form an initial document by term N×M matrix 50 (see FIG. 3) where N is the number of documents in the domain and M is the number of terms in the domain. The initial matrix 50 is preferably formed at step 23 and held in working memory.

Subroutine 37 next reduces the dimensionality of the document by term N×M matrix as shown in step 25 (see FIG. 2). This is preferably accomplished using the technique of Principal Component Analysis (PCA) 33. PCA involves computation of the Eigenvectors of the sum squared of products matrix, the correlation matrix, or the covariance matrix of the initial matrix and projection of the initial matrix onto the Eigenvectors. Singular Valve Decomposition (SVD) is one of several methods for computing the Eigenvectors. SVD is preferred because it is the most computationally efficient of the known methods.

At the Singular Value Decomposition step (SVD) 31, subroutine 37 decomposes the initial document by term N×M matrix 50 to obtain a left matrix 52 of N×M dimensionality (see FIG. 3) representing the Eigenvectors of $AA^T$ where A is the initial Document by Term matrix (or Term by Document matrix as explained below) and $A^T$ is the transpose of the initial matrix; a center (or singular) matrix 54 of M×M dimensionality consisting of the singular values of the initial matrix 50; and a right matrix 56 of M×M dimensionality representing the Eigenvectors of $A^TA$. In a preferred embodiment of the present invention, the right matrix 56 comprises the Eigenvectors of the sum squared of products matrix, however, depending on the application, the Eigenvectors of the covariance or correlation matrix may be used. Those skilled in the art will readily be able to determine which Eigenvectors to use. In the preferred embodiment, SVDPACKC™ available as public domain software is employed to carry out the SVD.

Note that the SVD process requires that the number of rows in the initial matrix be greater than the number of columns. In some domains, albeit a minority, the number of terms retained after preprocessing may be greater than the number of documents. In these cases, a term by document matrix of dimensionality M by N is used for the initial matrix and SVD is performed on the term by document matrix, instead of the document by term matrix as described above. This results in a left matrix of dimensions M by N and center and right matrices of dimension N by N.

Figure 3:
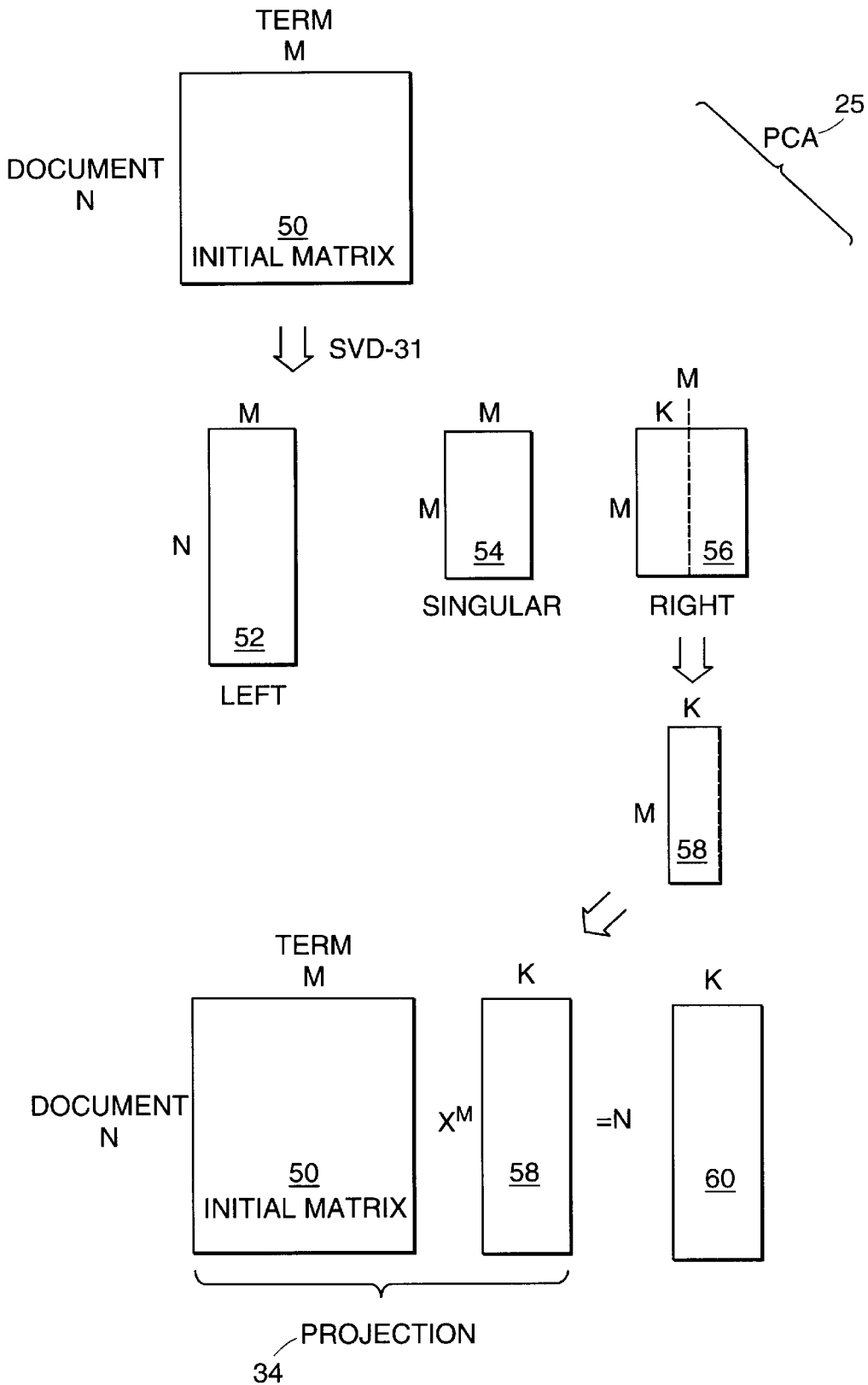
FIG. 3 is a functional diagram representing the various steps of the preferred embodiment of FIG. 2.

Returning now to the preferred embodiment where the initial matrix 50 is a document by term matrix, the right matrix 56 of M by M dimensionality is reduced in dimensionality to a working matrix of loading vectors 58 of M by K dimensionality at step 25 (see FIG. 3). This involves reducing the number of columns in the right matrix to K columns as shown in step 33 (see FIG. 2). The larger the value of K, the more literal the connection is between documents. The smaller the value of K, the more conceptual the relationship is between documents. For determining the value of K, the following rule of thumb is suggested:

1) 100<K<200 for domains having up to 100,000 documents;
2) K≧200 for domains having greater than 100,000 documents.

This step provides a working matrix of loading vectors 58 of M by K dimensions.

Next, at step 34 (see FIG. 2), the initial matrix 50 (see FIG. 3) is projected onto the working matrix of loading vectors 58. This last step of the PCA 25 technique allows for linear mapping of multidimensional data onto lower dimensions with a minimal loss of information. The projection 34 (see FIG. 2) yields independent combinations of the individual variables that represent directions of greatest variance in the original variable space. These combinations are the Eigenvectors of the covariance matrix or the sum squared of products matrix or the covariance matrix of the initial matrix 50. The projection 34 yields a matrix of reduced dimensionality 60 of dimensions N by K (see FIG. 3). For purposes of the present invention, the PCA "variables" comprise individual terms and PCA is employed to capture the underlying correlation in the terms. The reduced dimensionality affords efficient manipulation of the resulting vectors.

The N×K matrix of reduced dimensionality 60 contains principal component scores $F_{ij}$:

$$F_{ij} = \sum_{h=1}^{m} (x_{ih} y_{hj})$$

where
  i ∈ {1, . . . , n} and indicates a document;
  j ∈ {1, . . . , k} and indicates reduced dimension of document vector;
  x is the weight of term h in document i; and
  y is the Eigenvalue at the $j^{th}$ position in loading vector h.

The N×K matrix of reduced dimensionality 60 thus represents the documents as vectors in a reduced space of K dimensions reduced from the original M-dimensions. Although dimension and noise are reduced for purposes of manageability, important and indicative words or terms are maintained in the vectors of the matrix of reduced dimensionality 60 for meaningful processing in the following steps.

Following PCA 25, clustering is performed on the matrix of reduced dimensionality 60. At step 27 in FIG. 2, a Euclidean distance metric is preferably employed to cluster the vectors of the matrix of reduced dimensionality 60. In a preferred embodiment, a K-means clustering algorithm is employed, such as that described by A. C. Jain and R. C. Dubes, "Algorithms for Clustering Data," *Prentice Hall Advanced Reference Series,* Prentice Hall, Englewood Cliffs, N.J. 07632, pgs. 96–101, (1988) incorporated herein by reference. As a result, clusters of documents are formed and represented by the vectors of the N×K matrix 60. Clustering the N×K matrix of reduced dimensionality 60 is generally more robust than clustering in the original high-dimensional document by term N×M matrix 50.

Other clustering techniques are applicable to the present invention. One of the more popular distance measurements used for document clustering is the cosine similarity measurement. Although the inventors are aware of no formal studies comparing the performances of different similarity measurements, there has been some criticism of the cosine similarity measurements. Hierarchical clustering techniques historically have been a popular method for document clustering. A significant disadvantage of hierarchical clustering algorithms is that they are computationally expensive. Furthermore, usefulness of such algorithms is questionable in a dynamic environment where new documents are continuously added to the collection.

For each document in a given cluster, step 29 (see FIG. 2) computes which words had a substantial effect on each cluster. Those words are in common amongst the documents in the given cluster and therefore characterize the cluster. In particular, step 29 examines each of the products being summed in the principal component scores $F_{ij}$ a document. The largest of such products are identified and the corresponding term or word of the products are considered to be the words having the most impact or greatest effect on the cluster to which the document has been assigned. In the preferred embodiment, the products being summed in the principal component scores of a document are normalized according to any of several known methods. In the preferred embodiment, to accomplish normalization, the ratio between a product in a subject principal component score and the largest product in the subject principal component score is made. The former serves as a numerator and the latter is the denominator. The words corresponding to the ratios having a value greater than 0.5 are determined as having substantial (maximal) impact on a cluster. Those words are then placed in a cluster summary for indicating subject matter/content of the documents in the cluster 30.

Depending on the type of search initiated by the user, the summation of individual contributions can be performed according to either of the following techniques:

1) A set of words categorizing the articles in the cluster that are "hit" as a result of the query (browsing and search).
2) A set of words categorizing the entire cluster (browsing).

Alternatively, the combination of these two categorized techniques can be used to determine the validity of the cluster for the present query.

In the first technique, a user may be interested in only those articles in each cluster which contain the query word. In this case, the user is interested in categorizing the cluster only from the point of view of the documents that contain the particular keyword. It should be noted that pre-computing the contribution of the words for each keyword present in at least one vector in a cluster may be computationally expensive, even though this is a one-time expense. However, the on-line computation of these contributions for only the document vectors that are a result of the query is readily accomplished since this is far less computationally expensive.

If the user is browsing, that user may prefer to know the contributions of each word for the entire cluster. This would be true in situations where the user is interested in a smaller number of documents than those which are computed in the first technique, and the user would like to browse those documents which do not necessarily contain search words in the query, but yet are still present in the cluster. In this manner, the user is not limited by the query words chosen, but instead may search beyond the query word. In such a case, it is possible to compute the sum total of the contribution of all document vectors in a particular cluster.

An experiment was conducted using the UNIX_95 database from a popular COMET database maintained by Digital Equipment Corp.™ At the time, the UNIX-95 database consisted of 22,509 documents. For the experiment, the entire set of documents was used. Principal components were computed using a sparse iterative SVD algorithm. For principal component analysis (PCA) it is necessary to define the number of components or "K" to be retained in the working matrix of loading vectors 58.

Despite efforts to maintain the database preprocessing to a series of steps which are largely domain independent to facilitate replicability, in this case there was a need for some specific domain-dependent preprocessing. This pertains primarily to certain types of input format which have an associated template. Often, if the length of a document is not sufficiently large, the words in the template dominate the document content and these documents tend to get clustered together on the basis of common templates. In an effort to avoid such meaningless clusters, the template information was masked out.

In the final implementation, "K" was selected as 533 principal components from an initial matrix containing 11,707 terms. Although in the initial set of experiments K was set to 533, subsequent experiments with K set following the above-prescribed rule of thumb (100<K<200) produced similar results. The total of 22,509 documents in 533 dimensional projected space were clustered into 400 clusters. Partial results of this clustering are shown in FIGS. 4A and 4B and described below.

As explained above, the categorization is accomplished by combining the loading of the different elements in each individual cluster. It therefore follows that words having non-zero loading will be words that appear at least once in that cluster. In FIG. 4A, experimental clusters 0, 140, and 222 are shown with the top 15 words categorizing each cluster. It should be noted that the words beyond the top 15–25 offer little information and therefore, do not have useful categorizing power.

As seen in FIG. 4A, each cluster can be distinguished by the words that categorize the cluster. Cluster 0 clearly is directed to "backing up and restoring from dump tapes", cluster 140 is directed to "printing and printer related" problems, and cluster 222 deals with "rebuilding or installing of a system". Note that in cluster 222, the third word is "kernal" which is a misspelling for "kernel". Therefore, the word was commonly misspelled in the database. It can also be noted that certain words such as "sandy" in cluster 140 and "khp" in cluster 222 indicate the names or initials of hot-line specialists who typically handle this class of problems, and therefore, their names occur among the top 15 words. Although these words do have a significance from a data mining standpoint, they do not add much information for characterizing clusters. Depending on the application, filtering methods can be employed to remove the signature tags in a manner similar to the masking of input templates described above. Considering the clusters shown in FIG. 4B, it is clear that all clusters deal with printer related problems. However, by studying the top few words, it is possible to distinguish between clusters 140, 277, and 291. The purpose of such fine-grained clustering is to allow the users to narrow down their search to a very limited number of articles.

FIG. 5 provides the results of a specific query "backup" 102 for an on-line categorization of clusters as described above. This query resulted in a hit of 2722 documents 103 in the UNIX-95 database 101. These results were organized as categorized clusters and cluster summaries 104A–104F. Six clusters with the highest number of query "hits" were returned as shown.

Each cluster summary 104A–F includes a cluster identification number 112A–F, keywords 105A–F, and document titles 106A–F. The identification numbers 112A–F identify a given cluster in a particular domain. A document count 107A–F is returned along with the identification number 112A–F to indicate the number of documents in the cluster which resulted in query "hits". For example, 64 documents 107A in cluster 0 112A resulted in hits from the query "backup" 102.

Keywords identifying the cluster 105A–F are also returned, preferably in order of weighting. For example, in cluster 9 112B, the keywords "backup", "copy", "directory", "create", and "pages" represent keywords for that cluster. Document titles 106A–F are also returned in the cluster summaries 104A–F. The document titles 106A–F allow the user to scan the titles of the documents to determine which documents the user may wish to further investigate. For example, in Group 106, the title "? on NSR backing up Novell servers" indicates to the user that the document is related to general questions regarding backing up on Novell servers, while the title "NSR client won't back up" indicates a document related to a different type of problem. Each document title is transmitted along with a distance indicator 108A–111A. The distance indicator 108A–111A represents the vector distance from the centroid of that particular cluster centroid. For example, a distance of 0.11 108A is closer to the centroid than a distance of 0.20 111A and therefore, the document corresponding to the centroid distance of 0.11 is probably more relevant to the query than the later document.

As seen in FIG. 5, Group 0 is directed to "dump command and backing onto tapes" while Group 119 deals with "restoring from the root directory". Groups 70, 106, and 121 all deal with backup across networks. However, each group handles a separate issue, for example, Group 70 is directed to product Networker™, while Group 121 deals with DECNSR™ related issues. It should be noted that Group 9 consists of documents with no real characterization because this grouping is clustered primarily on template information.

Programmers implementing the present invention are free to extract the cluster summary data to fit the needs of the application. The cluster summary data may be presented in a user friendly interactive interface to allow the user to select the format of the returned data or to select a particular number of keywords or documents in each cluster summary. For example, in FIG. 5, the number of keywords is set to 10 and the number of documents is set to 4.

The following example describes the working of principal component analysis (PCA) in the context of the present invention. Although the present invention will be commonly employed for application in databases having complete articles, clustering and retrieval of the sentences shown in FIG. 6A is used for purposes of example. Sentences 1–19 are analogous to documents in a database. From the list of 19 sentences shown in FIG. 6A, 12 words were chosen to form the vectors in the bag of words model. This resulted in an initial document by term matrix 64 of dimension 19×12 as shown in FIG. 6B. The initial matrix 64 is referred to herein as matrix A and each element of the initial matrix is referred to herein as $a_{ij}$.

Figures 6D, 6E:
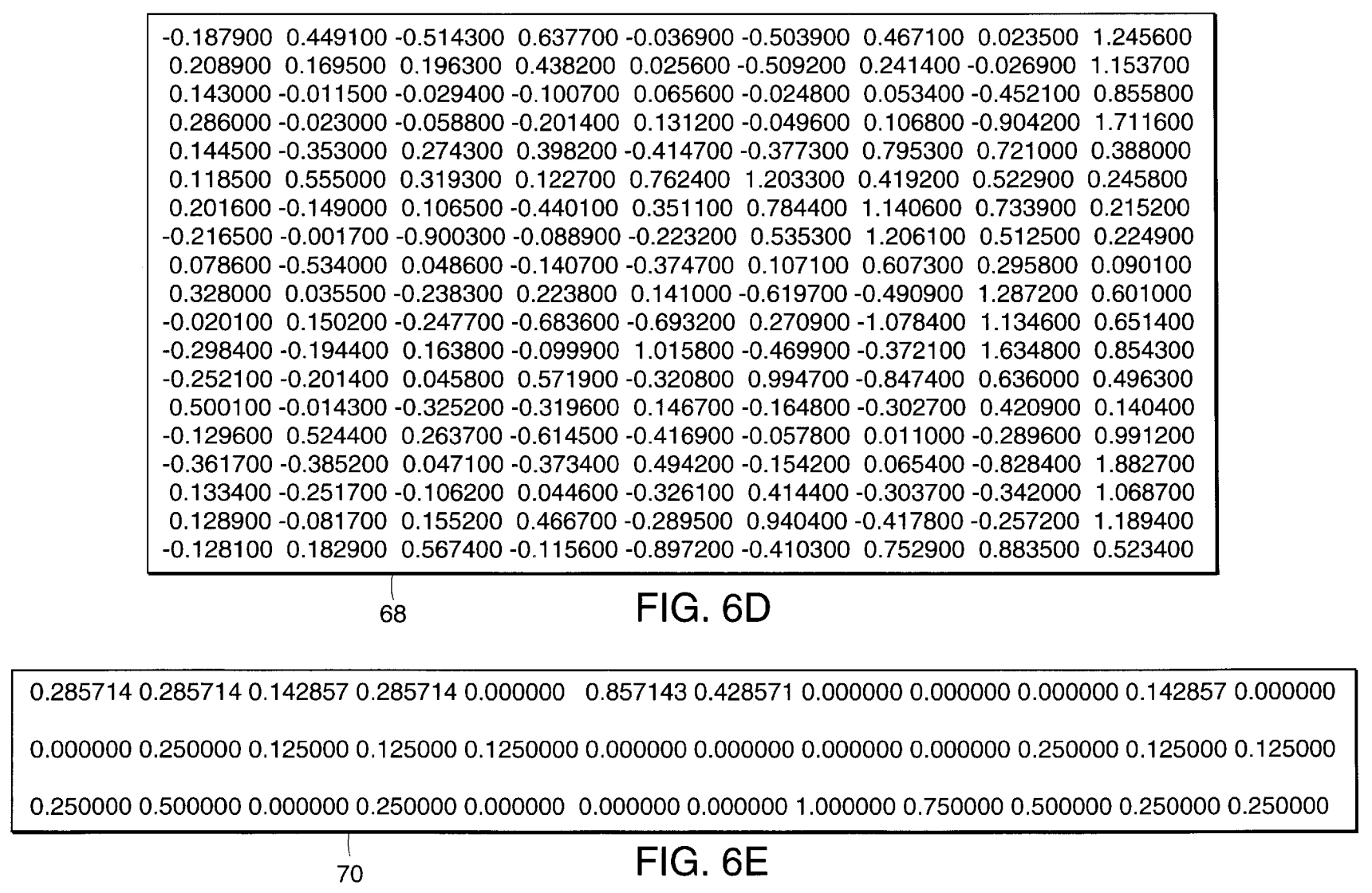

Singular value decomposition using SVDPACKC™ was performed on the initial matrix 64 to generate the right matrix 66 shown in FIG. 6C. This matrix 66 represents the Eigenvectors for the right matrix resulting from singular value decomposition. For purposes of the present analysis, a value of 9 was selected for "k" and the initial matrix 64 was projected on the first nine Eigenvectors of the loading vector matrix 66. This reduced loading vector matrix 66 is referred to herein as E and each element of the loading vector matrix is referred to herein as $e_{ij}$. The projection of the initial matrix A 64 into the reduced dimensional space of loading vector matrix E 66 is obtained as shown below to form a matrix of reduced dimensionality 68 as shown in FIG. 6D.

$$P = A \times E^T$$

where:

P is the matrix of reduced dimensionality 68

$E^T$ is the transpose of the working matrix of loading vectors 66

A is the initial matrix 64

The resultant projected values of the initial matrix onto the first 9 Eigenvectors of the working matrix of loading vectors is shown in FIG. 6D as a matrix of reduced dimensionality P 68 (19×9 dimensionality).

This resulting matrix of reduced dimensionality 68 was then clustered into three clusters using a K-means clustering algorithm. The resulting centroids 70 in the elements in each cluster are illustrated in FIG. 6E. Using the centroid shown in FIG. 6E, cluster memberships were defined using a nearest-neighbor rule with each centroid. The categorization of each cluster is accomplished by computing the loading of each element in that cluster across all patterns in that cluster:

$$\text{load}_j^P = \sum_{i \in P} a_{ij} \sum_{k=1}^{PRINC} |e_{jk}|$$

where:

$\text{load}^P_j$ is the load of element j in cluster P; and

PRINC is the number of principal components chosen to compute the loads, otherwise referred to herein as "k".

For the present example, the value of parameter PRINC was arbitrarily set to 5. In general, for large domains PRINC is determined using the rules of thumb described above for setting K. The results of these computations are shown in FIG. 6F as Clusters I through III. Note that in Cluster I, both "restore" and "dump" occur in the same frequency but "restore" has a higher loading than "dump". Similarly, in the same cluster, note the same phenomenon with "backup" and "questions". Further note that in a preferred application of the present invention, the vectors of the initial matrix A are prepared using either the "Tf-idf" or the "normalized Tf-idf" weightings as described above. This will add some domain knowledge to the weightings, thus making the loading more useful.

Given the above, in FIG. 6G, a query "backup" is entered by the user. This query results in "hits" of article numbers 11, 12, 17, and 18, which fall into cluster numbers I and III. Computing the contributions of the words for only these articles provides the results shown in FIG. 6G. In the tables of FIG. 6G, depending on the interest, whether it involves dump/restore problems or NSR backup problems, the user chooses the appropriate cluster for browsing. It should be noted that in this example, words with non-zero contributions are chosen to identify the clusters. As explained above, in the real application, only the top few words will identify each cluster as keywords.

In this manner, a domain of documents is represented as a large dimensionality term by document initial matrix. The dimensionality of the initial matrix is reduced to form resultant vectors. Subsequently, the resultant vectors are clustered such that the corresponding documents are grouped into a plurality of clusters. The clusters are defined by keywords which are automatically generated as a result of clustering the resultant vectors. The keywords having highest weight are grouped together to form cluster summaries indicative of the documents in that cluster. This is a significant advantage over prior art techniques which first cluster the documents and require human interpretation of the cluster summaries with regard to categorization and naming of cluster keywords.

A given domain may be continually clustered in accordance with the present invention as new documents are added to a domain. Alternatively, the domain may be reclustered periodically in an off-line process. For example, re-clustering may be performed nightly during periods of low domain access. Furthermore, clustering may take place on-line in response to a user query. Other strategies for re-clustering may also be used.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A computer method for clustering documents comprising the steps of:

in a digital processor, representing each document by a respective M dimensional vector in a matrix, where M equals a number of words in a predefined domain of document terms, such that an initial matrix of documents is formed;

reducing dimensionality of the initial matrix to form resultant vectors of the documents; and clustering the resultant vectors such that different respective documents are grouped into a plurality of clusters.

2. A method as claimed in claim 1 further comprising the step of identifying words having greatest impact on documents in each cluster, said identified words representing keywords for each cluster.

3. A method as claimed in claim 2 wherein the step of representing each document includes forming a term by document matrix for the initial matrix and wherein the loading vectors comprise a left matrix obtained by the step of applying singular value decomposition.

4. A method as claimed in claim 2 wherein the step of identifying words includes:

for each resultant vector, representing each component part of the resultant vector as a sum of products, each product being indicative of weight of a respective word;

identifying certain products as being substantially larger than other products; and selecting respective words of said certain products as being words having greatest impact on the document represented by that resultant vector.

5. A method as claimed in claim 4 further comprising the step of:

in each resultant vector of a given cluster, for each component part, normalizing the products with respect to the largest product in that component part.

6. A method as claimed in claim 1 wherein the step of reducing dimensionality includes:

applying singular value decomposition to the initial matrix to obtain loading vectors; and forming a reduced matrix obtained by projecting the initial matrix onto the loading vectors to obtain a matrix of reduced dimensionality.

7. A method as claimed in claim 6 wherein the loading vectors are selected from a set of Eigenvectors consisting of: Eigenvectors of a sum squared of products matrix of the initial matrix; Eigenvectors of a covariance matrix of the initial matrix; and Eigenvectors of a correlation matrix of the initial matrix.

8. A method as claimed in claim 6 wherein the step of representing each document includes forming a document by term matrix for the initial matrix and wherein the loading vectors comprise a right matrix obtained by the step of applying singular value decomposition.

9. A method as claimed in claim 1 wherein the step of clustering includes performing K-means clustering on the resultant vectors.

10. A method as claimed in claim 1 further comprising the step of forming a cluster summary from the identified words for a cluster; and in response to a keyword query for document retrieval: comparing keywords of the query to the cluster summaries; and returning document clusters, including cluster summaries, based on said comparison.

11. A computer apparatus for clustering documents comprising:

a memory for storing documents, each one of said documents represented by a respective M dimensional vector in a matrix where M equals a number of words in a predefined domain of document terms such that an initial matrix of documents is stored;

a dimensionality reducer for reducing the dimensionality of the initial matrix to form resultant vectors of the documents, the reducer executed on a processor coupled to the memory;

a clusterer coupled to the reducer for receiving and clustering the resultant vectors such that different respective documents are grouped into different clusters.

12. The apparatus of claim 11 further comprising an identifier for identifying words having greatest impact on the documents in each cluster, said identified words representing key words in each cluster.

13. The apparatus of claim 12, wherein the identifier comprises: means for representing each component part of the resultant vector as a sum of products, each product being indicative of weight of a respective word; means for comparing the magnitude of relative products and identifying certain products as being substantially larger than other products; and selecting means for selecting respective words of said certain products as being words having greatest impact on the document represented by that resultant vector.

14. The apparatus of claim 13 further comprising: normalization means for normalizing the products with respect to the largest product in that component part.

15. The apparatus of claim 11, wherein the dimensionality reducer comprises a decomposer for applying singular value decomposition to the initial matrix to obtain loading vectors; and a projector for forming a reduced matrix obtained by projecting the initial matrix onto the loading vectors to obtain a matrix of reduced dimensionality.

16. The apparatus of claim 15, wherein the loading vectors are selected from Eigenvectors consisting of: Eigenvectors of the sum squared of products matrix; Eigenvectors of the covariance matrix; and Eigenvectors of the correlation matrix of the initial matrix.

17. The apparatus of claim 15, wherein the initial matrix is a document by term matrix and wherein the loading vectors comprise a right matrix obtained by singular value decomposition.

18. The apparatus of claim 11, wherein the initial matrix is a term by document matrix and wherein the loading vectors comprise a left matrix obtained by the decomposer.

19. The apparatus of claim 11, wherein the clusterer performs K-means clustering on the resultant vectors.

20. The apparatus of claim 10 further comprising a summarizer for forming a cluster summary from the identified words for a cluster and means for responding to a key word query for document retrieval by comparing key words of the query to the cluster summaries, and returning document clusters, including cluster summaries based on the comparison.

* * * * *